United States Patent [19]
Slack

[11] 3,911,352
[45] Oct. 7, 1975

[54] BLOCKING OSCILLATOR TYPE POWER SUPPLY WITH POWER FOLDBACK SHORT CIRCUIT PROTECTION

[75] Inventor: William Frederick Slack, Andover, N.J.

[73] Assignee: OPT Industries, Inc., Phillipsburg, N.J.

[22] Filed: May 13, 1974

[21] Appl. No.: 469,437

[52] U.S. Cl.................. 321/14; 321/2; 317/33 VR; 317/36 TD
[51] Int. Cl.².................... H02H 7/10; H02H 9/02
[58] Field of Search ....... 317/16, 31, 33 VR, 33 SC, 317/53, 36 TD; 321/2, 4, 14; 323/8, 18, 19, 22 T; 307/265, 275; 331/112, 146, 148, 149, 186

[56] References Cited
UNITED STATES PATENTS

| | | | |
|---|---|---|---|
| 3,305,756 | 2/1967 | Doss et al. | 321/2 |
| 3,427,500 | 2/1969 | Harney, Jr. et al. | 331/112 X |
| 3,440,564 | 4/1969 | Kuiper | 331/112 |
| 3,673,487 | 6/1972 | Hendrickson | 323/22 T |
| 3,681,711 | 8/1972 | Hanby | 331/149 X |
| 3,697,857 | 10/1972 | El-Banna | 321/14 |
| 3,701,937 | 10/1972 | Combs | 321/14 X |

Primary Examiner—Miller J. D.
Assistant Examiner—Patrick R. Salce
Attorney, Agent, or Firm—Arthur L. Lessler

[57] ABSTRACT

A power supply of the blocking oscillator type in which the load is connected to a secondary winding of the blocking oscillator transformer. A shunt regulator provides regulation of the voltage delivered to the load, and the circuit is arranged so that load current is drawn only when the blocking oscillator transistor is non-conductive. The blocking oscillator circuit includes a capacitor which is repetitively charged at a rate which determines the operating frequency of the oscillator, the capacitor being repetitively charged at a rate which enables the oscillator to operate at a given frequency when the load has a given value. Also included in the circuit is means for repetitively charging the capacitor at a rate which causes the oscillator to operate at a substantially lower frequency when the secondary winding of the transformer is short-circuited, thus limiting the power dissipated in the oscillator to a permissible value under such short-circuit conditions.

18 Claims, 4 Drawing Figures

BLOCKING OSCILLATOR TYPE POWER SUPPLY WITH POWER FOLDBACK SHORT CIRCUIT PROTECTION

This invention relates to a power supply of the blocking oscillator type for supplying power from an AC or DC source to a load, and short-circuit protection means for said supply.

With the advent of the widespread use of integrated circuitry in such devices as electronic calculators, digital clocks, and similar equipment, it has become possible to construct such devices with relatively low levels of power consumption, typically on the order of 1 to 10 watts. While these relatively low power levels usually permit battery-powered operation, it is often desirable to operate such electronic devices from standard 120 or 240-volt, 50 or 60 Hz power lines. Since isolation of the electronic circuitry of the device from the power line is an essential requirement for safety, it is necessary to employ a transformer to couple the power line to the circuitry. However, in modern integrated circuit electronic devices of the types previously mentioned, a 50 or 60 Hz power transformer, even when designed for the aforementioned low power levels, has a size and weight which may be substantially greater than that of the circuit to which it is coupled.

In order to alleviate this problem, power oscillators operating at frequencies considerably higher than the 50 or 60 Hz power line frequency are often employed in low level power supplies. The relatively high frequencies at which these oscillators operate permit the use of small ferrite core transformers, of considerably less size, weight and cost than their 50 or 60 Hz power transformer counterparts. Among the types of power oscillators presently in use in such low level power supplies is the blocking oscillator.

Since conventional blocking oscillators generate pulses whose width is determined primarily by the saturation characteristics of the magnetic core of the transformer used in the oscillator, the pulse width and therefore the voltage or current developed at the output of the power supply are affected by variations in temperature and other factors which affect the transformer core saturation characteristics. In addition, high voltage spikes on the power line, generated by motors, other inductive loads, thyristor circuitry, etc., are readily coupled to the output winding of the high frequency transformer utilized in the oscillator. These high frequency spikes can cause errors in such devices as electronic calculators and can destroy sensitive transistors and integrated circuits.

Accordingly, an object of the present invention is to provide a power supply of the blocking oscillator type which alleviates the aforementioned disadvantages of prior art blocking oscillator power supplies, and is protected against damage or destruction by short-circuits developed in the power supply load.

As herein described, there is provided a blocking oscillator type power supply with power foldback short-circuit protection. The power supply includes a transistor, a transformer having primary, output and tertiary windings, and a first time constant circuit. Means is provided for coupling the primary winding of the transformer to the transistor and the tertiary winding of the transformer to the transistor and the time constant circuit to provide positive feedback to cause the transistor to oscillate at a given frequency. Means is provided for connecting the output winding of the transformer to a load. Means is also provided for causing the transistor to oscillate at a frequency determined by a second time constant circuit which is substantially lower than the frequency determined by the first time constant circuit when the output winding of the transformer is short-circuited by the load. Thus the power delivered to the load is substantially decreased and the power dissipated in the oscillator is limited to a safe operating value while the output winding is short-circuited.

Figure 1:
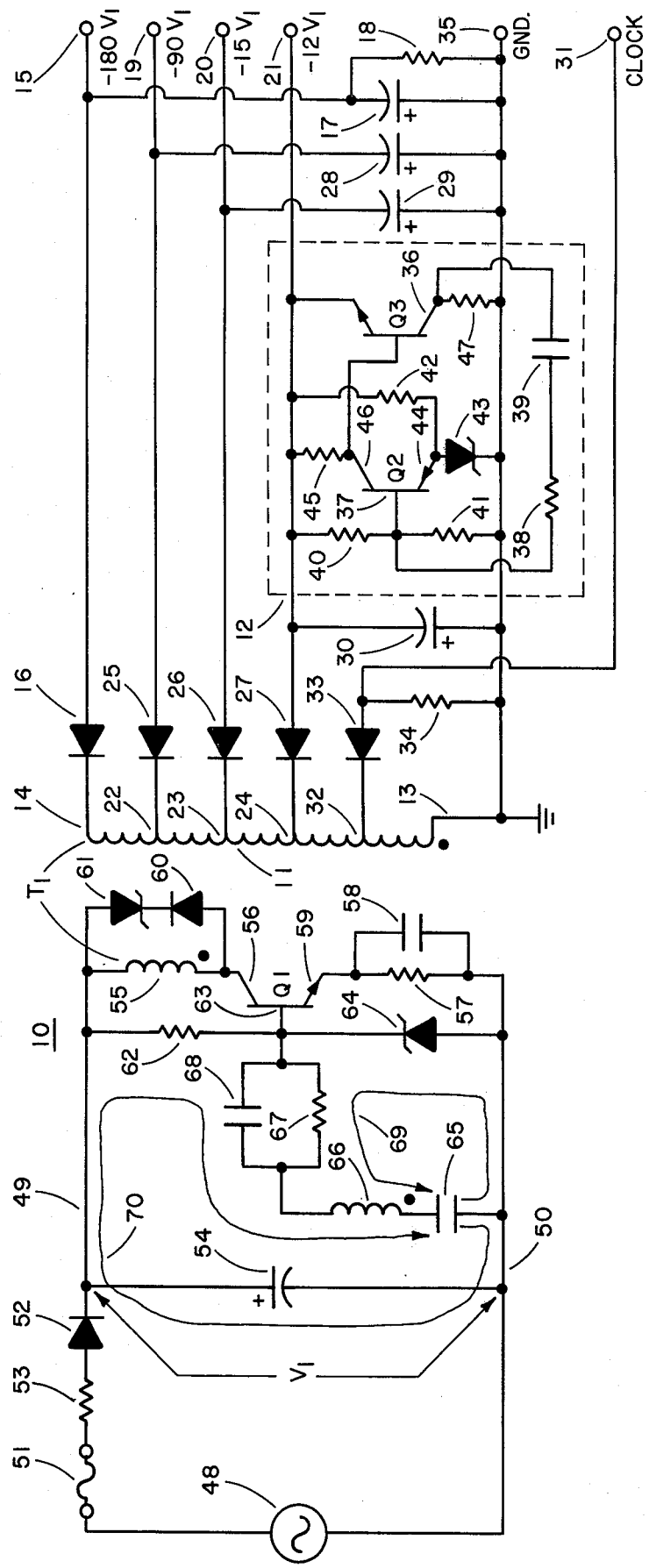
FIG. 1 shows a blocking oscillator type power supply according to an embodiment of the present invention.

The power supply shown in FIG. 1 comprises a power source section which supplies an operating DC voltage $V_1$ to the blocking oscillator which is indicated generally as 10, and an output circuit which comprises a number of rectifier diodes and filter capacitors coupled to the secondary winding 11 of the blocking oscillator transformer $T_1$.

Coupled to one of these rectifier and filter combinations is a shunt regulator 12, which draws sufficient current from the secondary winding 11 to regulate the various output voltages derived therefrom.

The particular output circuit shown in FIG. 1 is designed to supply operating potentials to an electronic calculator. One end 13 of the secondary winding 11 is connected to ground, with the other end 14 being connected to the −180 volt output terminal 15 via rectifier diode 16. Filtering and coarse load regulation of the −180 volt output are provided by the filter capacitor 17 and bleeder resistor 18 (which also provides coarse load regulation of the other outputs), respectively.

Similarly, the −90 volt output terminal 19, the −15 volt output terminal 20 and the −12 volt output terminal 21 are connected to corresponding taps 22, 23 and 24 of the secondary winding 11 via rectifier diodes 25, 26 and 27, respectively. The rectified output voltages at terminals 19, 20 and 21 are filtered by respective filter capacitors 28, 29 and 30. Unidirectional clock pulses at the operating frequency of the blocking oscillator 10 are provided to the clock output terminal 31 from a tap 32 on the secondary winding 11, via the rectifier diode 33 and resistor 34.

In the electronic calculator into which the power supply is incorporated, the −90 and −180 volt outputs at terminals 19 and 15 are utilized to power a digital display, and the −12 volt and −15 volt outputs provide power to integrated circuit logic elements. The clock output provides pulses for counting and synchronization purposes within the logic circuitry.

The shunt regulator 12 essentially acts as a variable resistance in parallel with the filter capacitor 30, and is controlled in such a manner as to draw sufficient current from the secondary winding 11 of the transformer $T_1$ via the tap 24, to maintain the voltage between the −12 volt terminal 21 and the ground terminal 35 at the desired −12 volt value. Since the shunt regulator 12 loads down the secondary winding 11, it affects the output voltages at the other terminals 15, 19 and 20 in such a way as to provide regulation for these voltages as well.

The shunt regulator 12 acts as a variable frequency/-variable duty cycle and multivibrator which is controlled by the voltage at terminal 21 in such a manner that the frequency and duty cycle of the multivibrator are varied to maintain this voltage constant. The multivibrator comprises a complementary symmetry amplifier consisting of PNP transistor Q2 and NPN transistor Q3, with positive feedback being provided from the collector electrode 36 of Q3 to the base electrode 37 of Q2 via series-connected feedback resistor 38 and feedback capacitor 39. A sample of the voltage to be regulated is coupled to the base electrode 37 of transistor Q2 via the voltage divider comprising resistors 40 and 41. A reference potential derived from terminal 21 via the resistor 42 is developed across the zener diode 43 and applied to the emitter electrode 44 of the PNP transistor Q2. The DC voltage sample at the base electrode 37 of transistor Q2 is compared with the reference voltage at its emitter electrode 44, and an amplified signal is developed across resistor 45 at the collector electrode 46 of Q2, the DC level of this signal corresponding to the difference between the voltages present at its emitter and base electrodes 44 and 37, respectively.

The signal at the collector electrode 46 of transistor Q2 is directly coupled to the base electrode of transistor Q3, the emitter electrode of Q3 being connected directly to terminal 21 and its collector electrode being connected to ground via an output resistor 47.

The shunt regulator 12 thus operates in a switching mode in order to provide high efficiency with low power dissipation in transistors Q2 and Q3 and their associated circuit elements (except for resistor 47, which must necessarily dissipate sufficient power to perform the desired shunt regulating function). The shunt regulator 12 operates as a multivibrator with DC coupling of the amplifier portion comprising Q2 and Q3, and AC positive feedback from the collector of Q3 to the base of Q2 via resistor 38 and capacitor 39. If the voltage at terminal 21 begins to go more negative, the duty cycle and frequency of the multivibrator comprising the shunt regulator 12 are increased, resulting in an increase in the average or DC current drawn from the secondary winding 11 by the transistor Q3 and resistor 47. This increased current loads the seconary winding 11 and reduces the voltage at terminal 21 to its desired less negative value. Similarly, if the voltage at terminal 21 becomes less negative, the multivibrator comprising the shunt regulator 12 varies its frequency and duty cycle so as to draw less DC current through the transistor Q3 and resistor 47, thereby reducing the load on the secondary winding 11 and causing the voltage at terminal 21 to become more negative.

The operating voltage $V_1$ for the blocking oscillator 10 is derived from an alternating current power source 38, which may for example be the conventional 120-volt rms, 60 Hz power line. The power source 48 is coupled to terminals 49 and 50 of the blocking oscillator 10 via a fuse 51, rectifier diode 52, filter resistor 53 and filter capacitor 54. Due to the relatively small power consumption of the blocking oscillator 10 and its associated circuitry (typically on the order of 1 to 10 watts), the filter capacitor 54 is repetitively charged by the power source 48 to a voltage near the peak of the AC waveform. Where a 120-volt rms source is used, the filter capacitor 54 may typically be charged to a voltage on the order of 160 volts. If desired, the operating voltage $V_1$ may be derived from alternating current power sources of other voltages and frequencies than the 120-volt, 60 Hz power line, or alternatively a DC source may be utilized.

The blocking oscillator transformer $T_1$ has a primary winding 55 connected between terminal 49 and the collector electrode 56 of NPN blocking oscillator transistor Q1. An emitter resistor 57 and bypass capacitor 58 are connected in parallel between terminal 50 and the emitter electrode 59 of transistor Q1.

A clipping circuit comprising a rectifier 60 in series with a zener diode 61 is connected across the terminals of primary winding 55.

A biasing resistor 62 is connected between terminal 49 and the base electrode 63 of transistor Q1. A threshold device comprising a zener diode 64, which serves a dual purpose as will hereinafter be described, is connected between terminal 50 and the base electrode 63 of transistor Q1.

One terminal of a frequency determining capacitor 65 is connected to terminal 50, the other terminal of capacitor 65 being connected to one end of a tertiary feedback winding 66 of the blocking oscillator transformer $T_1$. The other end of the tertiary feedback winding 66 is connected through the parallel combination of a current-limiting resistor 67 and speed-up capacitor 68 to the base electrode 63 of transistor Q1. The purpose of resistor 67 is to prevent damage to the zener diode 64 which might otherwise result due to the high current pulses which occur during operation of the blocking oscillator. The speed-up capacitor 68 serves to prevent deterioration of the rise time of the blocking oscillator pulses as a result of the presence of the resistor 67.

Figure 2:
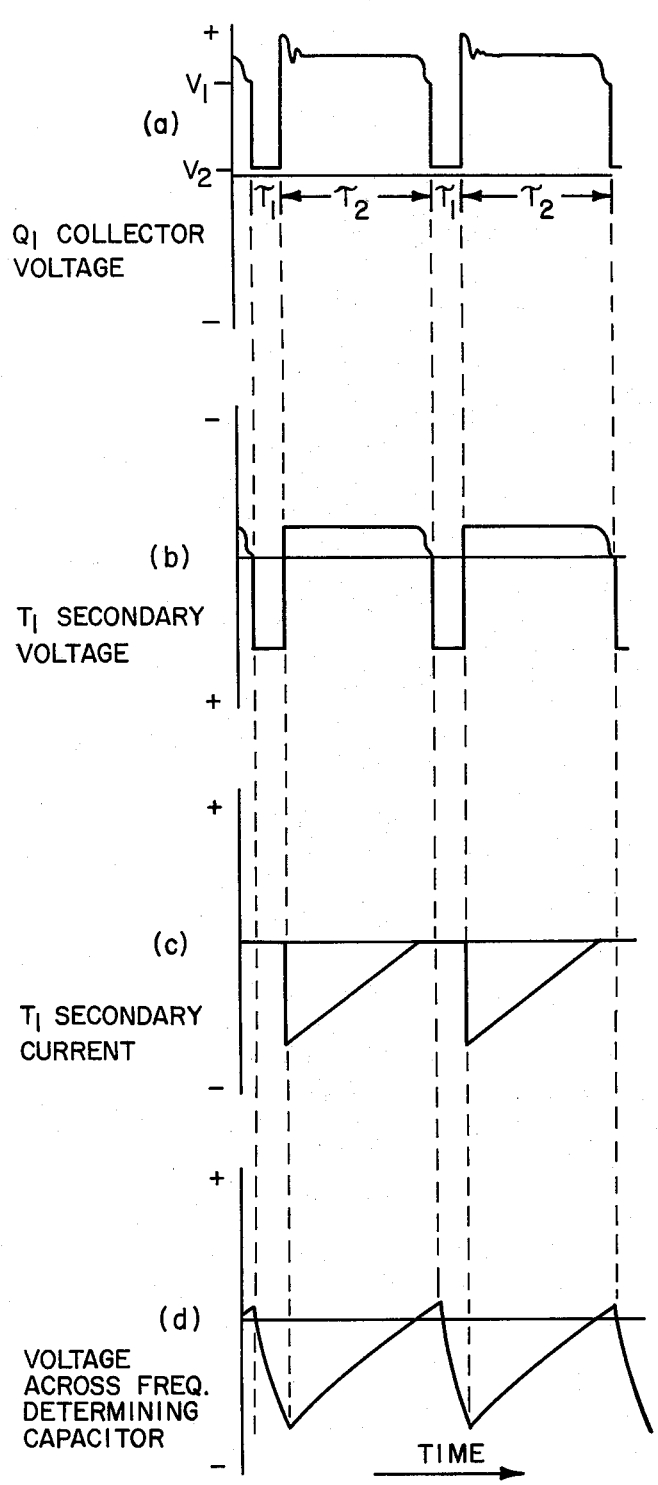
FIG. 2 shows voltage and current waveforms at various points in the circuit of FIG. 1 under normal operating conditions.
Figure 3:
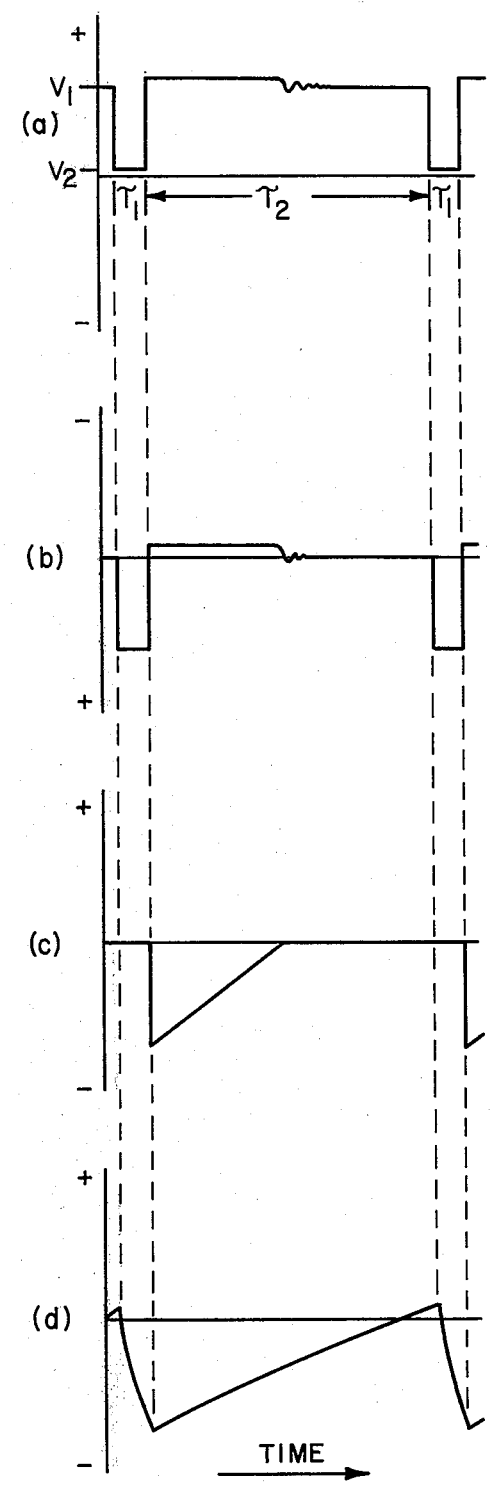
FIG. 3 shows voltage and current waveforms at corresponding points in the circuit of FIG. 1 under short-circuit operating conditions.

The operation of the blocking oscillator 10 under normal and short-circuit conditions will now be explained with reference to FIGS. 2 and 3, respectively. Each of these figures shows current and voltage waveforms at various points in the circuit, the waveforms of each figure being drawn to a common, vertically aligned time base. Portion (a) of each of FIGS. 2 and 3 shows the waveform of the voltage between the collector electrode 56 of transistor Q1 and terminal 50 under normal and short-circuit conditions, respectively. Portion (b) of these figures shows the voltage waveform between ground terminal 35 and any one of the taps 14, 22, 23, 24 and 32 of the secondary winding 11 under the aforementioned normal and short-circuit conditions, respectively. Portion (c) of these figures shows the current waveform through any of the output terminals 15, 19, 20 and 21 under said respective conditions. Portion (d) of FIGS. 2 and 3 shows the voltage waveform across frequency determining capacitor 65 under said conditions.

In the following discussion, the secondary winding 11 is considered to be short-circuited whenever a short-circuit is present between the end 13 of the winding and either the opposite end 14 thereof or any of the taps 22, 23, 24 or 32 thereof, or between any two of the points 14, 22, 23, 24, 32 and 13 thereof. By a short-circuit is meant any electrical condition which results in a sufficiently low impedance between the aforementioned points to draw a current from the secondary winding 11 which is substantially in excess of the normal load current supplied via the output terminals 15, 19, 20 and 21.

Positive feedback for operation of the blocking oscillator 10 is provided by inductive coupling between the primary winding 55 in the collector circuit of transistor Q1 and the tertiary feedback winding 66 in the base circuit thereof, these windings being connected in the necessary relative polarities to provide the desired positive feedback. The pulse width of the blocking oscillator is determined not by the saturation chacteristics of the magnetic core of the blocking oscillator transformer $T_1$, but rather by the threshold breakdown voltage of the zener diode 64, as will hereafter be described. Thus the blocking oscillator 10 is relatively unaffected by variations in the saturation characteristics of the core of $T_1$.

Initially, current from the power source connected between terminals 49 and 50 flows through biasing resistor 62 to the base electrode 63 of transistor Q1, causing current to begin flowing through the primary winding 55 of transformer $T_1$ to the collector electrode 56 of Q1. This increasing current causes the potential at the collector of Q1 to drop and, by inductive coupling between the windings 55 and 66, causes a voltage to be developed across the feedback winding 66 which is of such polarity as to render Q1 even more conductive. This positive feedback causes Q1 to be driven into saturation almost immediately, i.e. while the current through primary winding 55 is still small. Thereafter the impedance provided by the series combination of transistor Q1 (that is, between its collector and emitter electrodes) and emitter resistor 57 in parallel with bypass capacitor 58 is relatively small, so that for transient analysis purposes the primary winding 55 may be regarded as being connected directly across the terminals 49 and 50. Thus, the current through the primary winding 55 and the collector of Q1 may be regarded as the sum of the current drawn by the winding 55 disposed across the terminals 49 and 50, and the current drawn by the feedback winding 66 as reflected back to the primary winding 55. The collector current of Q1 as a function of time may be approximated by:

$$I_c = \frac{V_1}{R_{FB}} + \frac{V_1}{L_{55}} t \qquad (1)$$

where $I_c$ = Q1 collector current
$V_1$ = voltage between terminals 49 and 50
$R_{FB}$ = base circuit resistance as reflected across primary winding 55 through feedback winding 66
$L_{55}$ = inductance of primary winding 55
$t$ = time It is seen from Equation 1 that after transistor Q1 saturates, the current through Q1 increases approximately linearly as a function of time. As the current through primary winding 55 and the collector to emitter current of Q1 continues to increase, the potential at the collector electrode 56 of transistor Q1 remains at a low value close to the potential of terminal 50. During this time period while the primary winding 55 continues to be charged by the increasing current therethrough, designated at the time period $\tau_1$ in FIGS. 2 and 3, current flows from the feedback winding 66 through the parallel combination of resistor 67 and capacitor 68, through the base and emitter electrodes of transistor Q1, the parallel combination of resistor 57 and capacitor 58, to the terminal of capacitor 65 which is connected to terminal 50. The result of this current flow is to charge the capacitor 65 with a polarity such that the terminal of capacitor 65 which is coupled to the base electrode 63 of Q1 via winding 66 and the parallel combination of resistor 67 and capacitor 68, is charged negatively, as seen in FIG. 2($d$).

As the current through transistor Q1 and primary winding 55 continues to increase, current flows through the biasing resistor 62 and the base electrode 63 of transistor Q1 to the emitter electrode 59 thereof and the emitter resistor 57, causing the voltage developed between the emitter electrode 59 and the terminal 50 to increase. The emitter voltage continues to increase until the voltage between the base electrode 63 and terminal 50 reaches a value equal to the threshold breakdown voltage of the zener diode 64. At this point, the zener diode is rendered conductive, and current flow is diverted from the base electrode 63 of transistor Q1 to the zener diode 64, thus preventing further increase of the base current of transistor Q1, and therefore resulting in no further increase in the collector current thereof.

As soon as the current through the collector electrode 56 of transistor Q1 and the primary winding 55 of transformer T1 stops increasing, the voltage developed across the feedback winding 66 immediately drops to zero, and the negative potential coupled from the capacitor 65 to the base electrode 63 of transistor Q1 cuts off the transistor. As soon as the transistor Q1 is thus rendered non-conductive, marking the end of the time period $\tau_1$ as shown in FIGS. 2 and 3, the voltage developed across the primary winding 55 by this rapidly decreasing current drives the voltage at the collector electrode 56 rapidly upward. The energy stored in the primary winding 55 causes the voltage developed at the collector of Q1 to rise far above the power source voltage $V_1$. When the voltage at the collector electrode 56 has risen to approximately 100 volts above that of terminal 49, the clipping circuit comprising rectifier 60 and zener diode 61 is rendered conductive by breakdown of the zener diode. Thereafter the energy stored in the transformer $T_1$ is transferred by current flow through the secondary winding 11 to the rectifier diodes 16, 25, 26, 27 and 33 and the filter capacitors and other circuit elements associated therewith as well as the loads supplied thereby. This period of energy transfer is designated as the time interval $\tau_2$ in FIGS. 2 and 3. After the energy stored in the transformer $T_1$ is transferred to the output circuitry and loads through the secondary winding 11, the potential of collector electrode 56 begins to drop and current ceases to flow through secondary winding 11, essentially removing the load upon primary winding 55, and allowing the transformer $T_1$ to "ring" for approximately one-quarter of a cycle at the end of the time period $\tau_2$.

During the time that the primary winding 55 is discharging, i.e. the period $\tau_2$ during which transistor $Q_1$ is non-conductive, the decreasing current through primary winding 55 causes a voltage to be developed across feedback winding 66 of such polarity that the end of winding 66 adjacent the base electrode 63 is relatively negative and the other end of winding 66 is relatively positive. This potential difference causes capacitor 65 to be recharged to a positive potential relative to terminal 50 by current flow through the zener diode 64 (which is now forward-biased) and the parallel combination of resistor 67 and capacitor 68, this charging path being generally indicated by the loop 69. Thus the capacitor 65 and resistor 67 comprise a first time constant circuit which essentially determines the time it takes for the capacitor 65 to recharge to a sufficiently positive potential to allow the transistor Q1 to again become conductive. As soon as the capacitor 65 has been charged by current flow through the loop 69 to a potential sufficient to overcome any voltage developed across the tertiary winding 66 and thereby allow the base electrode 63 of transistor Q1 to become positive (relative to terminal 50), current begins to flow from the bias resistor 62 into the base electrode 63, causing the transistor Q1 to again become conductive and, by virtue of the positive feedback from primary winding 55 to feedback winding 66, rapidly become saturated, and the cycle is repeated.

The pulse width of the blocking oscillator, i.e. the time interval $\tau_1$, is determined primarily by the zener diode 64, emitter resistor 57, the inductance of primary winding 55 and the supply voltage $V_1$. The time constant of the circuit comprising frequency determining capacitor 65 and current limiting resistor 67 is made sufficiently small so that the operating frequency of the blocking oscillator under normal operating conditions (as opposed to short-circuit load conditions) is determined primarily by the output voltages developed across the secondary winding 11 of transformer $T_1$ and the turns ratios of the various windings comprising said transformer.

As seen in FIGS. 2(c) and 3(c), the rectifiers 16, 25, 26, 27 and 33 are polarized in such a direction that current is drawn from the secondary winding 11 of blocking oscillator transformer $T_1$ only during the time interval $\tau_2$ when transistor $Q_1$ is non-conductive. Thus coupling between the primary winding 55 and secondary winding 11 for flow of secondary current takes place only during the time interval $\tau_2$ during which the blocking oscillator transistor Q1 is nonconductive, and during which no current is drawn from the power source 48. Thus any spikes or other impulses coupled to the blocking oscillator circuit 10 from the power source 48 via terminals 49 and 50, are essentially isolated from the secondary winding 11.

The manner in which the blocking oscillator circuit 10 inherently provides good line regulation is evident from an examination of Equation 1. It is usually true that after a time interval $\tau_1$ corresponding to the oscillator pulse width, the right-hand factor in Equation 1 is the dominant one. Since the energy stored in the primary winding 55 during each oscillation cycle is equal to $$\text{Energy/Cycle} = \frac{1}{2} L_{55} I_c^2 \qquad (2)$$

and since from Equation 1 we may write approximately that $$I_c = \frac{V_1}{L_{55}} \tau_1 \qquad (3)$$

we have, combining Equations 2 and 3, $$\text{Energy/Cycle} = \frac{1}{2} \frac{V_1^2 \tau_1^2}{L_{55}} \qquad (4)$$

Since the pulse width $\tau_1$ is determined by the time it takes for the voltage at the base electrode 63 to reach the breakdown voltage of zener diode 64 by charging of the capacitor 58 through biasing resistor 62, we may approximate the charging time $\tau_1$ by $$\tau_1 = \frac{V_Z \tau_b}{V_1} \qquad (5)$$

where
$V_Z$ = breakdown voltage of zener diode 64
$\tau_b$ = time constant associated with charging through resistor 62 to raise base voltage of Q1

Combining Equations 4 and 5, we have $$\text{Energy/Cycle} = \frac{1}{2} \frac{V_Z^2 \tau_b^2}{L_{55}} \qquad (6)$$

It is therefore apparent that the amount of energy stored in the primary inductance 55 during each cycle of oscillation is approximately independent of the power source supply voltage $V_1$. It may similarly be shown that the operating frequency of the oscillator is only slightly affected by variations in the power source supply voltage $V_1$.

Thus the power delivered by the blocking oscillator 10 to the load or loads connected to the secondary winding 11 is substantially constant. Preferably, the values of the various circuit components are selected so that the power delivered by the blocking oscillator 10 is slightly greater than the full load output power, typically exceeding the full load power level by about 20 percent. The shunt regulator 12 dissipates this excess power to provide the desired voltage regulation.

The manner in which the blocking oscillator 10 operates to protect itself against short-circuiting of the secondary winding 11 will be best understood from the following description and with reference to FIG. 3 of the drawing.

Since no current flows through the secondary winding 11 during the time period $\tau_1$ that the transistor Q1 is conductive, the blocking oscillator 10 operates in substantially normal fashion under short-circuit conditions during this time interval. However, at the end of the time interval $\tau_1$ when the transistor Q1 is rendered non-conductive by the negative potential on the frequency determining capacitor 65, and the primary winding 55 commences to discharge through the rectifier 60 and zener diode 61, the secondary winding short-circuit prevents any significant voltage from being developed across the feedback winding 66. Therefore no voltage is developed across the winding 66 to cause charging of the capacitor 65 through the loop 69, and the capacitor 65 must instead charge by the flow of current from the capacitor through the power source via terminals 50 and 49, the biasing resistor 62, the parallel combination of resistor 67 and capacitor 68, and the feedback winding 66, the current flow path being indicated by the loop 70 in FIG. 1. The value of the biasing resistor 62 is chosen to be substantially greater than the value of the current limiting resistor 67. Thus the resistors 62 and 67, in conjunction with the capacitor 65, form a second time constant circuit operative during the period when the secondary winding 11 is short-circuited, for charging of the capacitor 65 to a potential sufficiently positive to allow the transistor Q1 to again become conductive. Since the time constant for charging of the capacitor 65 through this circuit, as indicated by the loop 70, is substantially greater than the time constant associated with charging of the capacitor 65 through the loop 69, the time required for the capacitor 65 to become charged to a sufficiently positive potential to overcome any voltage developed across the feedback winding 66 and render the transistor Q1 conductive is increased considerably, as indicated in FIG. 3(d), thus substantially lowering the frequency of the oscillator 10 so long as the secondary winding 11 is short-circuited.

As seen in FIG. 3(c), the peak current delivered to the load during each cycle of oscillation under short-circuit conditions is substantially the same as that delivered during each cycle under normal operating conditions, and may even be slightly increased. However, the substantial decrease in operating frequency which takes place under short-circuit conditions, as previously discussed, greatly reduces the average current and power delivered to the load under such conditions.

As soon as the short-circuit on the secondary winding 11 is removed, the blocking oscillator 10 reverts to its normal mode of operation.

Typical values for the various components utilized in the circuit of FIG. 1 are listed in TABLE I.

TABLE I

| Component | Value | Component | Value |
| --- | --- | --- | --- |
| $T_1$ | Pot core transformer primary/secondary/ tertiary turns ratio 10.5:21.25:1 | 58 30 39 29 28 17 | 0.0022 mfd. 110 mfd. 0.01 mfd. 1 mfd. 0.39 mfd. 4 mfd. |
| 53 | 220 ohms, 2 W. | 52 | 1N4944 |
| 62 | 1.5 megohms, ¼ W. | 61 | 100 V. Zener Diode |
| 67 | 560 ohms | 60 | 1N4944 |
| 57 | 82 ohms | 16 | 1N4944 |
| 34 | 1,000 ohms | 25 | 1N4944 |
| 40 | 5,100 ohms | 26 | 1N4148 |
| 41 | 6,800 ohms | 27 | 1N4148 |
| 45 | 1,000 ohms | 33 | 1N4148 |
| 42 | 560 ohms | 43 | 1N753A |
| 47 | 100 ohms | 64 | 1N752A |
| 38 18 | 160,000 ohms | Q1 | D44R3 (General Electric Co., New York) |
| 54 | 40 mfd., 450 W.V. | Q2 | 2N2907 |
| 65 | 0.1 mfd. | Q3 | 2N1711 |
| 68 | 50 mmfd. | 51 | 1 amp. fuse |

Table II sets forth measurements of voltage regulation of the circuit of FIG. 1, when constructed utilizing the values set forth in Table I.

TABLE II*

| NOMINAL OUTPUT | LOAD CURRENT VARIATION | | Total Change in Output Voltage Worst Case with Load Variation and with Line Variation from 95 to 130 V.A.C., 60 Hz |
| --- | --- | --- | --- |
| | Minimum | Maximum | |
| -12 V. | 7.2 ma. | 11.3 ma. | 0.25 V. |
| -15 V. | 4.3 ma. | 4.9 ma. | 0.75 V. |
| -90 V. | 47 micro amp. | 400 micro amp. | 5 V. |
| -180 V. | 159 micro amp. | 4 ma. | 10 V. |
| Clock | Constant Load | | |

*Blocking oscillator and clock frequency 70 ± 5 kilohertz under line and load variations listed. Switching regulator 12 operates at frequency of approximately 30 kilohertz.

Figure 4:
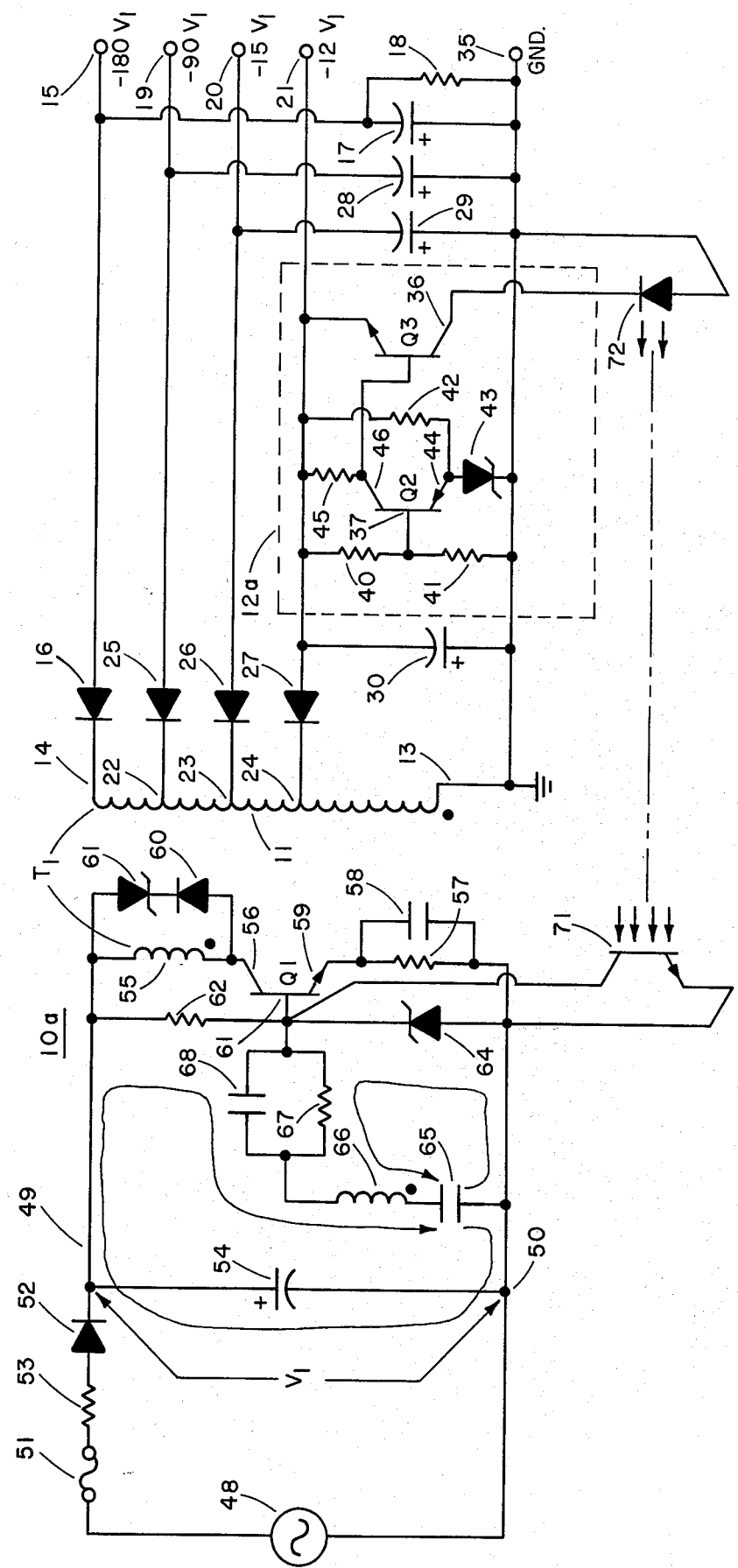
FIG. 4 shows a blocking oscillator type power supply according to another embodiment of the invention.

An alternative embodiment of the invention is shown in FIG. 4, in which voltage regulation at the output terminals 15, 19, 20 and 21 is accomplished by varying the operating frequency of the oscillator rather than by a shunt regulator as employed in the circuit of FIG. 1. The blocking oscillator circuit 10a of FIG. 4 operates to provide short-circuit protection in essentially the same manner as the circuit 10 of FIG. 1. Components of the circuit of FIG. 4 which operate in substantially identical fashion to corresponding components of the circuit of FIG. 1 are provided with identical numbers.

It is seen that the blocking oscillator circuit 10a of FIG. 4 is identical to the corresponding oscillator circuit 10 of FIG. 1, except for the addition of a phototransistor 71 in parallel with the zener diode 64. Whenever the phototransistor 71 is conductive, the base electrode 61 of transistor Q1 is directly connected to terminal 50, thus preventing the transistor from becoming conductive and thereby preventing the oscillator from operating. The transistors Q2 and Q3 are connected in circuit with their associated circuit elements within the block 12a to form a sensing amplifier. A light emitting diode 72 is connected between the collector of transistor Q3 and ground. The sensing amplifier 12a operates in such a manner that current flows through the light emitting diode 72 whenever the voltage between the −12 volt output terminal 21 and ground becomes more negative than desired. When this happens, the light emitting diode 72 is excited to radiate light which impinges upon the phototransistor 71 and renders it conductive. Preferably, the diode 72 and phototransistor 71 are disposed closely adjacent one another within a light-tight compartment.

When the phototransistor 71 is rendered conductive by the light impinging upon it from the light-emitting diode 72, it disables the blocking oscillator 10a, causing the filter capacitor 30 (and the other filter capacitors 17, 28 and 19) to begin to discharge. As soon as the capacitor 30 has discharged to a value below that desired, the current sensing amplifier 12a stops the flow of current through the light-emitting diode 72, thus causing the diode to stop emitting light and rendering the phototransistor 71 nonconductive. At this point the blocking oscillator 10a resumes normal operation and the control cycle repeats itself. Thus the arrangement shown in FIG. 4 operates as an on-off or switching type voltage regulator which operates by changing the frequency of the blocking oscillator 10a by recurrently disabling it from operation whenever the output voltage is more negative than desired.

While FIG. 1 has been described with reference to a shunt regulator 12 which provides voltage regulation at the regulator output terminals, the regulator circuit could readily be modified as is known by those skilled in the art, to provide regulation of load current rather than load voltage, if so desired. Similarly, the current-sensing amplifier 12a and associated optical control elements 71 and 72 shown in FIG. 4 could be modified to provide current regulation of the load rather than voltage regulation as herein described.

While the specific embodiments shown in FIG. 1 and FIG. 4 utilize a separate secondary winding of the blocking oscillator transformer as the output winding to supply power to the load, it is possible to dispense with the secondary winding 11 and utilize the primary winding 55 of the blocking oscillator transformer $T_1$ as the output winding in applications where electrical isolation from the power line is not required.

What is claimed is:

1. A blocking oscillator type power supply with power foldback short circuit protection, comprising:
   a transistor having first and second main electrodes and a control electrode;
   a transformer having a primary winding, at least one output winding, and a feedback winding;
   means for coupling said primary winding in series with said main electrodes and a source of potential difference;
   a frequency determining capacitor;
   means for coupling said feedback winding in series with said capacitor and in circuit with the control electrode of said transistor to provide positive feedback from said first main electrode to said control electrode by inductive coupling between said primary and feedback windings;
   biasing means coupled between said source and said control electrode;
   threshold means coupled to said control electrode for limiting the potential applied to said control electrode to a predetermined value and for providing a current flow path for said capacitor through said feedback winding;
   means for connecting said output winding to a load; and
   means for (i) causing said capacitor to be repetitively charged through said threshold means to enable said oscillator to operate at a given frequency when said load has a given value, and for (ii) causing said capacitor to be repetitively charged through said biasing means to cause said oscillator to operate at a substantially lower frequency when said output winding is short-circuited by said load, thereby substantially decreasing the power delivered to said load and limiting the power dissipated in said oscillator to a safe operating value while said output winding is short-circuited.

2. The power supply according to claim 1, wherein said output winding comprises a secondary winding of said transformer distinct from said primary and feedback windings.

3. The power supply according to claim 2, further comprising rectifying means coupled to said secondary winding.

4. The power supply according to claim 3, wherein said rectifying means comprises a half wave rectifier polarized to draw current from said secondary winding only when said transistor is non-conductive.

5. The power supply according to claim 4, wherein said transistor is bipolar, and said first main electrode, second main electrode and control electrode are the collector, emitter and base electrodes of said transistor respectively.

6. The power supply according to claim 5, wherein said threshold means comprises a Zener diode.

7. The power supply according to claim 4, further comprising shunt regulating means coupled to said rectifying means for drawing sufficient current from said secondary winding to maintain the output voltage of said rectifying means at a desired value.

8. The power supply according to claim 7, wherein said regulating means comprises a switching regulator.

9. The power supply according to claim 1, further comprising regulating means for varying the frequency of said oscillator to maintain the output voltage of said rectifying means at a desired value.

10. The power supply according to claim 9, wherein said regulating means includes voltage sensing means coupled to said rectifying means and frequency control means coupled to said transistor.

11. The power supply according to claim 10, wherein said regulating means further includes optical coupling means comprising (i) a light source coupled to said voltage sensing means, and (ii) a light responsive element coupled to said frequency control means.

12. The power supply according to claim 1, further comprising means for providing a periodic reference signal at the frequency of said oscillator.

13. The power supply according to claim 1, wherein said primary winding also serves as said output winding.

14. A blocking oscillator type power supply with power foldback short circuit protection, comprising:
   a transistor having collector, emitter and base electrodes;
   a transformer having a primary winding, at least one secondary winding, and a tertiary feedback winding;
   means for coupling said primary winding in series between said collector electrode and a first terminal of a source of potential difference;
   means for coupling said emitter electrode to a second terminal of said source;
   a capacitor;
   means for coupling said feedback winding in series with said capacitor between said base electrode and the second terminal of said source, the terminals of said primary and feedback windings being connected in such relative relationship as to provide positive feedback from said collector electrode to said base electrode by inductive coupling between said windings;
   a biasing resistor connected between said base electrode and a point having a potential relative to said second terminal which is of the same polarity as the potential of said first terminal relative to said second terminal;
   means for connecting said secondary winding to a load;
   a Zener diode connected between said base electrode and said second terminal, so that the capacitor is repetitively charged through said diode to permit said oscillator to operate at a given frequency when the load has a given value, said capacitor being repetitively charged through said biasing resistor to cause said oscillator to operate at a substantially lower frequency when the secondary winding is short-circuited by the load, thereby substantially decreasing the power delivered to said load and limiting the power dissipated in said oscillator to a safe operating value while said secondary winding is short-circuited; and
   rectifying means between said secondary winding and said load to provide unidirectional current to the load, said rectifying means including a half wave rectifier polarized to draw current from said secondary winding only when said transistor is non-conductive.

15. The power supply according to claim 14, further comprising regulating means for maintaining the voltage delivered to said load at a desired value by varying the frequency of said oscillator in response to variations in said voltage.

16. The power supply according to claim 14, further comprising regulating means for maintaining the current delivered to said load at a desired value by varying the frequency of said oscillator in response to variations in said current.

17. A blocking oscillator type power supply with power foldback short-circuit protection, comprising:
   a transistor;
   a transformer having primary, output and feedback windings;
   a first time constant circuit comprising a resistance-capacitance network;
   means for coupling said primary winding to said transistor and said feedback winding to said transistor and said time constant circuit ot provide positive feedback to cause said transistor to oscillate at a given frequency;
   means for connecting said output winding to a load;
   a second time constant circuit comprising a second resistance-capacitance network;
   a frequency-determining capacitor common to both of said resistance-capacitance networks; and
   means for causing said transistor to oscillate at a frequency determined by said second time constant circuit which is substantially lower than said given frequency when said output winding is short-circuited by said load, thereby substantially decreasing the power delivered to the load and limiting the power dissipated in said oscillator to a safe operating value while said output winding is short-circuited.

18. The power supply according to claim 17, further comprising rectifying means for drawing current from said output winding only when said transistor is non-conductive.

* * * * *